US006830452B2

(12) United States Patent
Spector

(10) Patent No.: US 6,830,452 B2
(45) Date of Patent: *Dec. 14, 2004

(54) COMPUTER TRAINING SYSTEM WITH AUDIBLE ANSWERS TO SPOKEN QUESTIONS

(76) Inventor: Donald Spector, 380 Mountain Rd., Union City, NJ (US) 07087

(*) Notice: Subject to any disclaimer, the term of this patent is extended or adjusted under 35 U.S.C. 154(b) by 87 days.

This patent is subject to a terminal disclaimer.

(21) Appl. No.: 09/990,048

(22) Filed: Nov. 20, 2001

(65) Prior Publication Data
US 2002/0031754 A1 Mar. 14, 2002

Related U.S. Application Data

(63) Continuation-in-part of application No. 09/766,951, filed on Jan. 22, 2001, now Pat. No. 6,517,351, which is a continuation-in-part of application No. 09/025,347, filed on Feb. 18, 1998, now Pat. No. 6,227,863.

(51) Int. Cl.[7] .................................................. G09B 9/00
(52) U.S. Cl. ....................................... 434/169; 434/323
(58) Field of Search ............................ 434/118, 307 A, 434/307 R, 322, 323, 167–169, 350, 362, 365; 707/4

(56) References Cited

U.S. PATENT DOCUMENTS

| | | | |
|---|---|---|---|
| 4,270,182 A | * 5/1981 | Asija | 704/8 |
| 4,884,972 A | * 12/1989 | Gasper | 434/185 |
| 5,727,950 A | * 3/1998 | Cook et al. | 434/350 |
| 5,799,267 A | * 8/1998 | Siegel | 434/156 |
| 5,836,771 A | * 11/1998 | Ho et al. | 434/362 |
| 5,864,844 A | * 1/1999 | James et al. | 707/4 |
| 6,336,029 B1 | * 1/2002 | Ho et al. | 434/362 |
| 6,501,937 B1 | * 12/2002 | Ho et al. | 434/362 |
| 2002/0150869 A1 | * 10/2002 | Shpiro | 434/156 |

* cited by examiner

Primary Examiner—Jessica Harrison
Assistant Examiner—Kathleen M. Christman
(74) Attorney, Agent, or Firm—Collard & Roe, P.C.

(57) ABSTRACT

A phonics training system provides immediate, audible and virtual answers to questions regarding various images such as objects, animals and people, posed by a child when the child views such images on a video display terminal of the system. The system provides virtual answers to questions without the need for an instruction or teacher and includes a computer having a video output terminal and an electronic library containing common answers to basic questions.

6 Claims, 1 Drawing Sheet

COMPUTER TRAINING SYSTEM WITH AUDIBLE ANSWERS TO SPOKEN QUESTIONS

RELATED APPLICATIONS

This application is a continuation-in-part of U.S. application Ser. No. 09/766,951, filed Jan. 22, 2001, now U.S. Pat. No. 6,517,351, which is a continuation-in-part of Ser. No. 09/025,347, filed Feb. 18, 1998, now U.S. Pat. No. 6,227,863, the entire contents of both applications being herein incorporated by reference.

FIELD OF THE INVENTION

This invention relates to a system and method for self-teaching, including self-teaching of young children, including children having developmental disabilities. The system of this invention includes apparatus for sensing an audible word or command of a young child for effecting a computer generated response to said audible word or command, wherein said response can include a graphical depiction of the letters of said audible word or command, an object image related to said audible word or command, or any combination thereof. In addition to the graphical depiction generated by the computer response to audible words or commands, the system also provides audible answers preferably by a virtual teacher to questions orally posed by a child pertaining to the depiction displayed.

DESCRIPTION OF THE PRIOR ART

The main purposeful activity undertaken by young children is play. From a developmental perspective, play is often considered as practice for the child's later roles in life. Through play a child can explore the environment and gain knowledge regarding the physical laws governing objects, socialize with adults and peers to gain important interpersonal skills, and use his or her imagination and begin honing the pathways for conscious thought. Thus, it can be argued that play in humans is a tool leading to perceptual, conceptual, intellectual and language development, the basic building blocks required for the formulation of higher cognitive functions.

For healthy children, very early childhood play is either oriented toward physical objects or toward symbol manipulation. Meaningful verbalizations may not yet be possible. However, eventually through play, the child begins to attach specific names to objects. Soon afterwards, more complex sentences are learned and the child talks to himself or herself in order to achieve specific activities. Meaningful self-speech, when activity and verbalization merge and the child can say what he or she is doing, is believed to be a significant point in intellectual development. Self-speech is eventually made non-verbal, and we talk to ourselves through specific mental activities. This is often referred to as self-reflective activity and occurs throughout childhood and even adulthood. For self-reflective activity to occur, one must be able to recall and manipulate specific memory events. The brain system that this refers to is working memory which is theorized to have both a verbal/language component, a phonological loop, and a visual imagery component, the visuospatial sketch pad.

The child's brain is different from the adult brain in that it is a very dynamic structure that is evolving. A two year old child has twice as many synapses (connections) in the brain as an adult. The young brain must use these connections or lose them. Thus, failure to learn a skill during a critical or sensitive period has important significance.

It is known that the greatest period of intellectual development potential for a child is before the age of three. However, children do not normally start any formal education until age five or six, and infants typically in an ideal family only receive one to two hours of daily intellectual stimulation.

It would, thus, be advantageous to provide a virtual play and educational environment for children, including those children whose learning experiences have not been adequately developed, or for medical reasons have been slow to develop. Such a virtual educational environment would be advantageous for several reasons: developmental milestones may be achieved more quickly; the child may learn to distinguish between images and scenes created from multiple images; and it may give the child a vehicle for self-reflective activity and thus be a seed for the development of imagination, consciousness, and communication. One such virtual learning environment system is described in U.S. Pat. No. 5,815,147 (to Bogen, et al. issued Sep. 29, 1998).

Notwithstanding the advances set forth in Bogen, et al, i.e., virtual play environment, the potential of such environment has been limited by its focus on children with limited interactive capabilities, and the fact that interacting is pre-programmed and not based on the child's spontaneous behavior. Clearly the potential of such a system, which has yet to be more fully realized either by both children with special needs, or by children not similarly encumbered, has not been fully realized because of such limited focus (children with learning or physical disabilities). Thus, the Bogen, et al, system is inherently limited because of its failure to provide adequate interaction of the child with the virtual play environment through the use of multiple interactive input; and, a more varied or comprehensive set of learning objectives (lessons) to retain the child's interest. Accordingly, there continues to exist a need for such enhancement so as to provide a learning environment wherein each child, including those with limited physical and/or emotional development, can cause the environment to react with it in some meaningful and responsive way; and, encourage the child to look beyond a possible limited learning environment to related subjects in alternative sources of such information.

It is, therefore, an object of this invention to provide a computer training system for self-teaching, particularly for young children. A further object of the invention is to provide a virtual environmental system for those children whose learning experiences have not yet adequately developed, or for medical reasons have been slow to develop. Another object of this invention is to provide a training system for a child of pre-school age, which system can provide an audible response to questions posed orally by such child with respect to words and/or images appearing on a video display terminal of such system. Another object of this invention is to provide the depiction of a virtual teacher on a video display terminal, who audibly answers questions posed orally by a child using the system. These and other objects will readily become apparent to those skilled in the art in light of the teachings herein set forth.

SUMMARY OF THE INVENTION

In its broad respect, this invention is directed to a computer training system having one or more input and output devices for effecting interactive communications with the learning system and a video display terminal for graphical depictions of the system response to the output devices, wherein the interactive communication is prompted by one or more user initiated inputs, the improvement comprising:

a) means for processing information generated by a user of the virtual learning system;

b) means for displaying on said video display terminal, information generated by the virtual learning system in response to the information generated by the user;

c) means for the presentation in audible or video form by the user inquiries regarding the information observed on the display terminal;

d) an electronic library of answers to inquiries which commonly arise from viewing the information; and e) means for the recognition of words spoken in the user's inquiry and rendering, via the output device from the library, the answer most closely related to at least some of the works and their sequences as presented in the inquiry.

While the self-teaching system of the present invention is particularly useful for young children, it can, of course, find application in the studies of older students and even in training of adults.

DESCRIPTION OF THE PREFERRED EMBODIMENT

Figure 1:
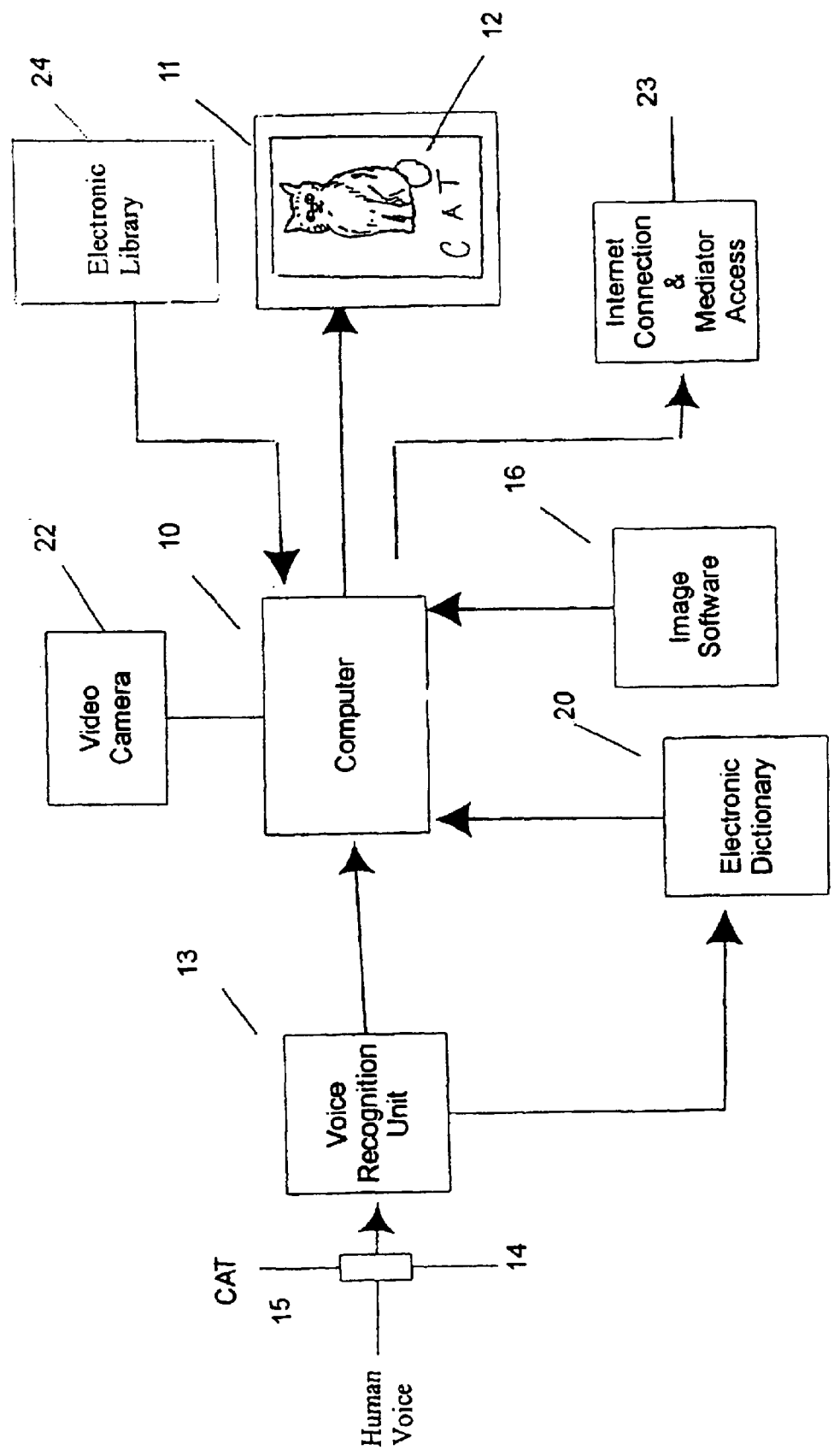
FIG. 1 depicts the virtual learning environment system of this invention.

The training system of the present invention is a virtual learning environment system as shown in FIG. 1.

The system comprises a general-purpose programmable computer, such as personal computer 10, a visual display device 12 (preferably a touch screen visual display device), and appropriate input/output devices such as a microphone and/or speaker, a keyboard, a mouse not shown, and a video camera 22, and could also include a single switch input device (joy stick) not shown. Computer 10 also has access to the Internet via Internet access port 23. Depending upon the age and the extent of the user's physical abilities, either the touch screen video display device, microphone, the keyboard, mouse, or joy stick, or any combination thereof, may be employed as one means for selecting and manipulating objects shown on the display. In a preferred embodiment of the virtual learning environment illustrated herein, the computer 10 is programmed to provide a non-directed play environment for the user in the form of real or simulated images, and an electronic library 24 associated with the computer in which are electronically stored answers to commonly asked inquiries resulting from observation of images.

Referring now to FIG. 1, illustrated therein is an educational training system in accordance with the invention that includes a digital computer 10 having a central processing unit (CPU). The output of computer 10 is coupled to a video monitor or terminal 11 having a screen 12 on which may be presented the letters of the alphabet which spell a word spoken into the system by a pre-school child, an image of the object identified by this word, or real or simulated images, visual images generated by image software 16 and/or video camera 22. Also, computer 10 is coupled to an electronic library 24, having voice response means for orally providing answers to questions posed through voice recognition unit 13.

In the input of computer 10 is a peripheral in the form of a voice recognition unit 13 coupled to a microphone 14. When a pre-school child (or other speaker) speaks into microphone 14, unit 13 then recognizes the distinctive pattern of sounds in the voice of the child, and converts these sounds into digitized signals that are fed into computer 10 and processed therein.

Associated with computer 10 is an electronic phonetics dictionary 20. Digitally stored in the electronic phonetics library are both the phonetic sounds which constitute the words contained in the dictionary. The contents of this dictionary are downloaded into the memory of the computer.

The voice recognition unit 13 is operatively coupled to the electronic phonetics dictionary 20, so as to condition this dictionary to render it responsive to the distinctive voice pattern of the child using the system. Thus, while the phonetic sounds of the words digitally stored in the electronic dictionary are synthetically generated sounds, not sounds derived from a human voice, the dictionary must be able to compare a word or phrase spoken by a pre-school child with the same word or phrase stored in the dictionary. In order to be able to do so, before the child uses the system, he or she first speaks for a few minutes into the voice recognition unit to permit the unit to analyze the voice of the child and then recognize its unique pattern.

The elctronic-dictionary 20 has digitally stored therein a vocabulary of words and letters of the alphabet which spell each word. When a child speaks into the input of the computer, the computer scans the words in the dictionary to find the stored digitized sounds of the word from the voice recognition unit 13.

When a match is found by the computer, then the letters or the word yielded in the output of the computer are presented on screen 12 of the computer terminal 11. Hence, the child can see how the word he has just spoken into the computer is spelled.

Also associated with computer 10 is an image software module 16, having stored therein a library of digitized images, each being a picture or drawing of an object identified by a respective word included in the vocabulary of the electronic dictionary. Thus, if the dictionary contains the word DOG, CAT, BOY, HOUSE and BOTTLE in the module 16, there will be a picture or drawing of each of these objects.

When computer 10 responds to an incoming word, such as CAT, and presents on screen 12 the spelling of CAT, it at the same time presents on the screen an image of a cat.

Thus, whatever word is spoken into the input of the computer by a child using the system which identifies an object, this causes the computer to yield in its output terminal the letters spelling this word, and an image of the object identified thereby.

In this way, a pre-school child using the system is taught how to spell the words which are included in his vocabulary, while seeing for each word an image of the object presented by the word. This serves not only to impress on the child's mind the spelling of the word, but also serves to clarify its meaning. Thus, if a pre-school child is confused as to the distinction between the words BOY and BOOK, when he says the word BOOK and then sees a book on the screen, he knows that a book is not a boy.

In practice, the system need not be confined to words that are nouns and identify objects, for the system can include verbs and adjectives commonly used by pre-school children, such as RUN, JUMP, BIG and LITTLE. In order to illustrate these verbs and adjectives, the image software 16 must include appropriate illustrations. Thus, RUN can be illustrated by a child running, BIG by a giant and SMALL by a midget.

One may use as images cartoon characters that most children are familiar with, having seen them on TV shows for children. Thus, PLUTO, the Disney character, can be used to represent a dog, and DONALD DUCK to represent a duck.

It is also useful for teaching pre-school children to spell and read, to include arithmetic numbers such as the digits one to ten, and how these digits are spelled. When children learn how numbers are spelled, they can read stories that refer to "three bears" or "five chairs."

In the learning process, it is desirable when a child is shown how to spell a word, that he then be required to spell the word aloud, for in doing so, one then knows whether the child has learned the spelling.

The system may be modified to test the pre-school child to determine whether he remembers how a word is spelled. Thus, after a child sees how the word CAT is spelled on screen 12, he may then be requested to speak into the microphone how this word is spelled by saying the letter C, then the letter A, and finally the letter T.

In accordance with one aspect of the invention, there is also included video camera 22, which can, for example, be focused on an infant in his or her crib. Movements from the infant can be detected by the video camera, digitized and applied to computer 10. Those movements, which initially may be random, can be utilized to allow the infant to begin to learn how to manipulate objects in a virtual environment. For example, if the infant initially moves his or her arm, this could result in movement of an object in the virtual environment causing the object to be moved from a first location to a second location depending on the particular movement of the infant. As the infant would continue to make random movements, there would be provided feedback from video monitor 11, which would indicate to the infant a positive indication of the correct movement to move a particular object in the virtual environment. In this manner, the infant would gradually learn the movements required to move objects in the virtual environment.

The invention also provides for a mediator to monitor the user's progress via connection to the Internet. For example, if the infant user successfully accomplished a particular task, the system could be modified to provide a new task for the user, or alternatively provide feedback to a caregiver on the progress of the infant user.

In addition, the connection to the Internet could also be used to provide additional information to be displayed on video monitor 11.

In the teaching system shown in FIG. 1, a child sees on the screen of the computer terminal the spelling of the word he has spoken into the computer and an image of the object identified by this word. But, the system depends on the ability of the child to speak into the computer the many words he knows, yet there is nothing to spur the child to speak words he uses infrequently. Thus, it may not occur to the child to speak the word BEAR or COW, for he rarely has occasion to use these words even though he knows them.

In order, therefore, for the child to exploit all of the words phonetically stored in the electronic dictionary 20, the training system may include a random access selector which may be actuated by the child or a caregiver using the system.

When the child or a caregiver activates a random access, selector, it then chooses at random the stored digitized sounds of one of the words in the dictionary, say BEAR, and feeds those sounds to an analog-to-digital converter D/A. The converter yields an analog signal of BEAR. This signal is amplified in an analog amplifier, and then reproduced by a loud speaker.

Thus, each time the child or a caregiver accesses the random access selector he or she hears a word randomly selected from the phonics dictionary. Because the child does not know what word to expect, this lends interest to this operation. The child must then speak the word he has just heard into the computer input, so that he can now see how it is spelled and what object it identifies.

Thus, the child may not have in his working vocabulary the word BOAT. But, when he hears this word extracted from the dictionary and speaks it into the computer, the child is then informed as to the meaning of this word by an image of a boat and how it is spelled.

In this way, the child is encouraged to explore the entire electronic dictionary rather than only those words that come to mind when using the training system.

Alternatively, one may provide a dedicated computer in whose memory is stored the electronic dictionary and the library of digitized images to provide a self-sufficient and compact device for home use by a pre-school child, or for use in an elementary school.

If, in the first grade of an elementary school, the students are given a simple story book to read, the dedicated computer in its electronic dictionary can include all of the words in the book except for articles and propositions. In this way, a child who masters the spelling of the words in the electronic dictionary will experience no difficulty in reading the book.

A further unique feature of the aforementioned training system allows a child of pre-school and elementary school age to actually pose questions to the system and receive a digitized oral answer to questions which a child of that age might be expected to ask after viewing an image on the video display terminal 11. The oral answer can be given on the display terminal by a virtual teacher so that the young child might believe he or she is hearing directly from a live person via the computer.

The child can access the library to obtain answers to commonly asked questions by speaking the questions into the training system. When words such as what, which, where, why, when, if, or other suitable words are spoken, the library is scanned for the words in the questions which when taken together will select the closest answer to the question used.

It may also be feasible for an icon such as a question mark to appear on the display terminal when the child is using the computer training system. When the child wishes to pose a question, he or she can click on the icon, and have immediate access to the library or answers for the spoken question.

The computer thereupon makes a determination of what is on the display terminal and searches the electronic library for the appropriate answer to the questions. Upon selection of the answer, it is conveyed to the child electronically by a digitized voice given simultaneously with a image on the display terminal.

For example, a pre-school child in using the training system may speak the word CAR and observe the image of an automobile on the video display terminal, with the letters C-A-R appearing, and a virtual teacher sounding the word CAR and also spelling aloud the letters C-A-R.

In viewing the image of the car on the display terminal, the child may not know the word for the color of the particular car depicted. By asking "what is the color of the car," the library scans its data bank and finds the closest answer to the words WHAT; CAR; and COLOR, and a virtual teacher appears on the display terminal screen and orally announces that the car shown is BEIGE, while both spelling and pronouncing the word one or more times.

A more mature child may want to know the year and model of the same car, and pose the questions "what is the year and producer of the car?" After scanning the library data bank, a dialog box appears and the virtual teacher will announce that it is a 2001, Ford.

Hence, by using the present training system, the child can have immediate access to answers to questions which might enter his or her mind upon viewing an image on the video display terminal. With continued use of the training system, the child will readily accept the presentation of answers by a virtual teacher as though a human were providing the answers as each question was presented.

The training system of the present invention, therefore, provides a learning environment which in the mind of the child approximates reality about what appears on the video display terminal. The child asks a question by speaking and receives an immediate audible answer from a virtual teacher. In view of the oral presentation of a question and the immediate receipt of an oral answer, it is as if a human teacher were present in the room and available to answer the child's questions.

The advantage of using the system of this invention is that it does not require the presence of a teacher to answer commonly asked questions by the user. Depending upon the complexity of the images or material appearing on the video display terminal, most simple questions can be virtually answered immediately after the question is posed.

The absence of a live teacher will, of course, be a great savings of time and expense.

However, a virtual teacher appearing on the video display unit with the answer to the inquiry will give the child the sense that his or her question is being answered by a teacher who actually is providing the answer.

A further advantage is that the answer to a question appears immediately If a child cannot get an immediate answer, he or she may forget to ask the question of a teacher at a later date and hence deprive themselves of added knowledge.

While many of the tutorials which come with new software display an animated character or person who audibly comments on whether the operator has performed a function properly or not, there is no means for presenting audibly or otherwise a question and receiving an audible answer from a virtual teacher.

A child using a training system which does not provide immediate answers to questions that the child might have, may be reluctant or forget to raise the question at a later date. By obtaining an immediate answer to his or her questions, the knowledge of the child is enhanced which otherwise may not occur until later, or forgotten by the child.

Although the invention has been illustrated by the foregoing disclosure, it is not to be construed as being limited to the material disclosed therein, but rather, it is directed to the generic area as hereinbefore disclosed. Various modifications and embodiments thereof can be made without departing from the spirit or scope thereof.

What is claimed is:

1. A virtual learning system adapted to provide a child with answers to at least one audible inquiry that the child provides when observing an image on a screen of a computer capable of producing sound, the system comprising:
    (a) an image creation means for creating the image on the display in response to at least one audible word from the child, comprising:
        (1) a computer having an output terminal provided with a screen;
        (2) an electronic dictionary associated with the computer in which is digitally stored the phonetic sounds of words that identify objects and the letters of the alphabet that spell the words, including an object in response to the at least one audible word; said electronics dictionary being contained in software downloaded into the memory of the computer;
        (3) an image library associated with the computer in which is digitally stored images of objects, including an image of said object in response the at least one audible word; and
        (4) means including a voice recognition unit in the input of said computer, the unit acting to recognize the distinctive sound pattern of the child speaking into the unit and to condition the electronic dictionary to respond to the pattern, whereby when the child speaks into the unit a specific word included in the dictionary identifying a particular object, the output of the unit is digitized and the computer then acts to scan the dictionary to find the corresponding phonetic sounds digitally stored therein, and when a match is found to present on the screen the letters which the specific word and the image of the object identified thereby;
    (b) an electronic library associated with the computer in which is digitally stored answers to commonly asked inquiries resulting from observation of images stored in said image library; and
    (c) wherein said voice recognition unit recognizes distinct words and the sequence pattern of the at least one audible inquiry, thereby prompting the computer to scan the electronic library to find at least one answer most closely related to the at least one audible inquiry and, when a match is found, presents said at least one answer to the child.

2. The virtual learning system of claim 1, wherein said answer is presented audibly by the computer.

3. The virtual learning system of claim 1, wherein said answer is presented visually by the computer on the screen.

4. The virtual learning system of claim 1, wherein a virtual image of a human appears on the screen and is synchronized with the presentation of the answer.

5. The virtual learning system of claim 4, wherein the human is a teacher.

6. The virtual learning system of claim 5, wherein said teacher appears in a classroom setting.

* * * * *